United States Patent
Neumann et al.

(10) Patent No.: US 6,448,760 B1
(45) Date of Patent: Sep. 10, 2002

(54) ARRANGEMENTS FOR DETECTING ROTATIONAL OR TRANSLATORY MOVEMENT AND THE DIRECTION THEREOF

(75) Inventors: Jürgen Neumann, Ebersdorf (DE); Gerhard Juerjens, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/308,197

(22) PCT Filed: Nov. 14, 1997

(86) PCT No.: PCT/DE97/02717

§ 371 (c)(1),
(2), (4) Date: May 14, 1999

(87) PCT Pub. No.: WO98/21552

PCT Pub. Date: May 22, 1998

(30) Foreign Application Priority Data

Nov. 14, 1996 (DE) .......................................... 196 48 622
Jan. 11, 1997 (DE) .......................................... 197 01 927

(51) Int. Cl.⁷ ............................... G01B 7/14; G01B 7/30
(52) U.S. Cl. ............................. 324/207.2; 324/207.25; 324/207.24
(58) Field of Search ....................... 324/207.2, 207.21, 324/207.22, 207.23, 207.24, 207.25, 207.26, 252

(56) References Cited

U.S. PATENT DOCUMENTS

| | | | |
|---|---|---|---|
| 4,507,591 A | 3/1985 | Kelleher | 318/254 |
| 4,725,776 A | 2/1988 | Onodera et al. | 324/207.2 |
| 4,754,221 A | 6/1988 | Ao et al. | 324/207.2 |
| 5,021,736 A * | 6/1991 | Gonsalves et al. | 174/52.2 |
| 5,070,298 A | 12/1991 | Honda et al. | 324/207.2 |
| 5,086,272 A | 2/1992 | Hinrichsen | 324/207.13 |
| 5,089,817 A | 2/1992 | Santos et al. | 341/15 |
| 5,517,112 A | 5/1996 | Vig et al. | 324/251 |
| 5,523,679 A | 6/1996 | Kalb | 324/165 |
| 5,614,821 A * | 3/1997 | Leiderer | 324/174 |
| 6,255,811 B1 * | 7/2001 | Hatazawa et al. | 324/207.11 |

FOREIGN PATENT DOCUMENTS

| | | |
|---|---|---|
| DE | 35 43 603 C2 | 6/1986 |
| DE | 40 18 834 A1 | 1/1991 |
| DE | 41 13 880 A1 | 10/1992 |
| DE | 41 25 482 A1 | 2/1993 |
| DE | 41 28 808 A1 | 3/1993 |
| DE | 42 33 549 A1 | 4/1994 |
| DE | 44 23 461 A1 | 1/1996 |
| EP | 0 151 002 | 8/1985 |

* cited by examiner

Primary Examiner—Jay Patidar
(74) Attorney, Agent, or Firm—Christie, Parker & Hale, LLP (57) ABSTRACT

The invention concerns arrangements for detecting a rotational or translatory movement between a signal-generating element having a symmetrical magnetic field and means for detecting the magnetic field of the signal-generating element. According to the invention, an analogue, magnet-sensitive sensor element is aligned such that the normal vector of the sensitive surface of the sensor element forms an angle to a vector pointing vertically from the sensor element perpendicularly to the axis of the signal-generating element. The sensor element generates signal pulses whose shapes between their edges are dependent on the direction of movement and rise or fall, such that, when the direction of movement is reversed, the sign of the signal shape changes. The invention proposes simple arrangements for detecting a rotational or translatory movement which requires only one sensor element yet has high resolution.

14 Claims, 7 Drawing Sheets

ARRANGEMENTS FOR DETECTING ROTATIONAL OR TRANSLATORY MOVEMENT AND THE DIRECTION THEREOF

BACKGROUND

The invention concerns arrangements for detecting a rotational or translatory movement.

Arrangements are known in which the rotational speed and the rotational direction of a rotary drive are determined by means of two Hall sensors offset from each other by 90°. For these arrangements, a N-S magnetized annular magnet is disposed concentric to the drive axis and nonrotatably connected thereto. During rotation of the annular magnet, the two Hall sensors disposed laterally to the annular magnet are each penetrated by a variable magnetic field. The magnetic field changes appearing on the sensors are converted by means of threshold value switches into two binary pulse sequences offset from each other by 90°. By counting the number of pulses per time unit, the rotational speed of the rotary drive can be determined; and by comparison of the two pulse sequences, the direction of rotation can also be determined.

Disadvantageously, two sensors are necessary in these arrangements for detection of the rotational speed and rotational direction. Because of the need for exact positioning of the two sensors relative to each other and relative to the axis of rotation, expensive construction is associated therewith. Cost-intensive bonding and connection of the two Hall sensors are also necessary.

From DE 42 33 549 Al, a device for detection of the rotational speed and the rotational direction of a rotary drive is known, which has a magnetic signal-generating element nonrotatably connected with the rotary drive. During rotation of the signal-generating element, a rotational direction encoded magnetic field, which is detected by a sensor and fed to an electric evaluation unit, is created. Since during rotation of the signal-generating element, a rotational direction encoded magnetic field is created, only one sensor is necessary for detection of the direction of rotation. Encoding of the direction of rotation occurs, for example, by means of an eccentric rotation of an annular magnet around the axis of the rotary drive or by encoding the magnetic field of the annular magnet.

Disadvantageous in the known device is the fact that encoding of the magnetic field is essential for detection of the direction of rotation. Simple to produce, inexpensive symmetrical annular magnets in concentric arrangement can, consequently, not be used.

From DE 44 23 461 Al, a volumeter for determination of the flow volume of a liquid through a volumeter body is known, wherein a magnet wheel is disposed nonrotatably on a screw rod with which a sensor arrangement with one sensor is associated. During rotation of the magnetic pole shoes of the magnetic wheel, an asymmetric magnetic field which enables detection of the direction of rotation develops on the sensor. With this device, a rotational direction encoded magnetic field is likewise generated.

DE 35 43 603 A1 describes a position detector with a ferromagnetic magnetoresistor unit, which is disposed at an angle relative to a multipolar annular magnet. A sensor to detect the magnetic leakage field of the annular magnet is disposed on the magnetoresistor unit. Because of the inclination of the magnetoresistor unit, the sensor is likewise disposed at an angle; however, it is not described that rotation direction-dependent signals are in any way evaluated.

From DE 41 25 482 A1, a synchro system with an annular magnet and two magnetic field sensor elements disposed offset relative to each other in the circumferential direction of the axis of rotation on a common sensor carrier is known. The two sensor elements are attached with an arrangement of their measurement axes parallel to each other on a mounting surface, which runs obliquely inclined relative to the axis of rotation of the magnetic element.

DE 41 13 880 A1 describes the realization of a fixed predetermined phase angle distance between measurement signals which are shifted by 90° relative to each other. For this, two Hall elements are fixedly mounted on a one-piece sensor carrier, and, in fact, on two mounting surfaces disposed at an angle relative to each other.

From EP 151 002 A2, an arrangement is known whereby the magnetic field generating part is located on the sensor element. A tipping of the sensor element takes place in order to adjust a specific magnetic field on the sensor favorable for measurement, but not for detection of a rotation direction-dependent signal.

The prior art is thus characterized by the fact that for detection of the direction of rotation either two sensors are used or encoding of the magnetic field occurs.

It is further known, for the determination of the speed of a translatory movement between two parts of an aggregate, to provide one aggregate part with a symmetrical magnet extending longitudinally and the other aggregate part with a Hall sensor such that upon relative movement of the aggregate parts, the Hall sensor moves parallel to the magnet and thus the magnetic field lines of the magnet pass through the Hall sensor. Disadvantageously, in such an arrangement it is impossible to also determine the direction of movement between the parts of the aggregate.

SUMMARY OF THE INVENTION

The object of the invention is to provide a simple arrangement for the detection of a rotational or translatory movement between a symmetrically structured magnet and a magnetic sensor element, whereby changes in the magnet's field strength act on the sensor element, for example, a Hall element. The arrangement should ensure reliable detection of rotational or translatory movement with only one sensor element, whereby a reversal of movement should be detectable within one signal period.

The solution according to the invention enables direction encoding with only one sensor element by means of a special alignment of an analog, magnet-sensitive sensor element. The solution according to the invention provides an intentional tipping or shifting of the sensor element in contrast to a transverse orientation of the sensor element relative to the signal-generating element. Thus, altered signals with additional informational value are created, which are used for the reliable detection of the rotational or translatory movement. The sensor element generates signal pulses which have a rising or falling signal waveform between their edges depending on the direction of movement. Upon reversal of the direction of movement, the sign of the signal waveform changes. Thus, a reversal of the direction, in particular, can be evaluated with high accuracy.

Transverse orientation of the sensor element is understood to mean an orientation in which the normal vector of the sensitive surface of the sensor element is perpendicular to the axis of the signal-generating element. A transverse orientation of the sensor element relative to the signal-generating element or its axis is used in all arrangements known in the prior art for detection of a translatory or rotational movement, since in this orientation the active component of the magnetic field and, accordingly, the signal generated, is the greatest. The signal associated with a transverse alignment of the sensor element is, however, not only maximal, but also symmetrical, such that no directional data are included in the signal.

In contrast, the present invention provides that the normal vector of the sensor element is not perpendicular to the axis of the signal-generating element. Thus, with a relative movement between the signal-generating element and the sensor element there is a rise or fall of the magnetic field measured, depending on the direction of movement, and on the strength of the respective transverse component of the vector of the magnetic field applied to the sensor element.

The solution according to the invention enables, in particular, an exact determination of a reversal of direction, since a symmetric signal develops only with a reversal of direction. Because of the deviation of the sensor element from the transverse position, the signal generated during right-hand rotation or left-hand rotation is not symmetric, but rises or falls. This rising or falling shape of the signal is likewise reversed upon a reversal of direction such that a maximum or minimum of the magnetic field strength is created. A symmetric signal is also created with this maximum or minimum as its center. This signal is readily detectable in a connected evaluation unit and indicates the exact point of the reversal of direction.

Moreover, the solution according to the invention enables detection of changes in speed, i.e., accelerations, within a pulse generated by a N- or S-magnetized region of the signal-generating element. Thus, the shape of the current or voltage signal generated in the sensor element changes when acceleration occurs, in particular the deviation of the signal is not constant.

In a first variant of the invention, the detection of a rotational movement occurs. A corresponding arrangement for detection of the angle of rotation, the speed of rotation, and/or the direction of rotation of a rotary drive has a signal-generating element, which is nonrotatably connected with the axis of rotation of the rotary drive. An analog, magnet-sensitive sensor element is associated therewith, whereby the normal vector of the sensitive surface of the sensor element forms, according to the invention, an angle with a vector pointing from the sensor element to the axis of rotation of the signal-generating element.

In a preferred embodiment of this variant, the sensor element is tipped relative to an axis which runs parallel to the axis of rotation. The normal vector of the sensitive surface of the sensor element is preferably disposed in a plane perpendicular to the axis of rotation. In this embodiment, there is a tipping of the sensor element relative to a transverse orientation relative to the axis of rotation.

In an alternative embodiment, the sensor element is laterally offset from a transverse orientation relative to the axis of rotation of the signal-generating element. Thus, here, there is no tipping, but rather a lateral shifting of the sensor element. The result is the same, since a symmetrical signal is likewise no longer generated in the sensor element.

An annular magnet or a magnetic disk is preferably used as the signal-generating element. To generate a symmetrical, periodic magnetic field, the annular magnet or the magnetic disk has along its circumference segments of different magnetic polarity N, S. The individual sectors are uniformly disposed and are identical in size.

A Hall sensor is preferably used as the magnet-sensitive sensor element. The semiconductor wafer of the Hall sensor represents the sensitive surface of the sensor element, which is aligned according to the invention. With perpendicular incidence of the magnetic field lines on the semiconductor wafer, a maximum signal is generated.

With the present invention, among other things, the non-symmetrical voltage waveform of the individual pulses of the analog voltage signal generated is evaluated. Thus, there is preferably an evaluation of the signal before a conversion of the analog signal into a digital signal. Otherwise, only the speed of rotation but not the direction of rotation can be determined. Consequently, it is preferable not to provide a threshold value switch to generate a digital signal until after the evaluation unit. However, it is also conceivable that both a first evaluation device and a threshold value switch are already integrated into the sensor element.

In a second variant of the invention, a translatory movement is detected. In this case, the signal-generating element extends preferably in the longitudinal direction and has alternating segments of different magnetic polarity N, S. The normal vector of the sensitive surface of the sensor element associated with the signal-generating element forms an angle relative to a vector from the sensor element perpendicular to the axis of the signal-generating element.

In a preferred embodiment of this variant of the invention, the signal-generating element is a bar magnet or a magnetic strip, which is, for example, connected with an aggregate part.

BRIEF DESCRIPTION OF THE DRAWINGS

The invention is explained in detail in the following with reference to the figures using several exemplary embodiments. They depict.

DETAILED DESCRIPTION

Figure 1:
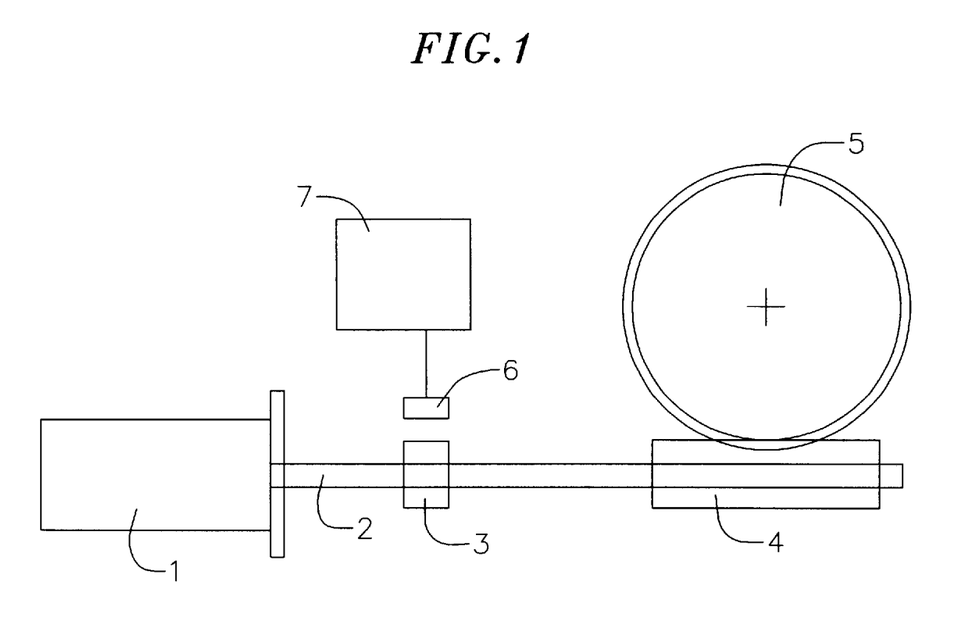
FIG. 1 schematically, an arrangement for detection of the angle of rotation, the speed of rotation, and/or the direction of rotation of a rotary drive.

FIG. 1 schematically depicts an arrangement for detection of the angle of rotation, the speed of rotation, and/or the direction of rotation of a rotary drive 1. An annular magnet 3 serving as a signal-generating element is disposed nonrotatably and concentrically on the axis of rotation 2 of the rotary drive 1. The annular magnet has N-S magnetized sectors of equal size. The attachment of the annular magnet 3 on the axis of rotation 2 is effected, for example, by gluing.

A Hall sensor 6, which generates, during rotation of the annular magnet 3, a Hall voltage, which is proportional to the magnetic field strength on the Hall sensor 6, is associated with the annular magnet 3. The Hall sensor 6 is connected via a line to an evaluation unit 7, to which the voltage signal detected is fed and which performs a signal evaluation, as will be explained in detail in the following.

A worm gear unit with a worm 4 rigidly connected to the axis of rotation 2, which worm meshes with a worm gear 5, is provided for the conversion of the rotational movement of the rotary drive 1 into a translatory movement. The worm gear 5 is connected to a drive element (not shown), for example, a cable drum or a pinion. Alternatively to a worm gear unit, other gear units may, of course, be used.

A preferred application is in a use for window lifters and sun roofs in motor vehicles. The period of one revolution of the rotary drive motor in these applications is typically 14 to 15 milliseconds. To be able to ensure trouble free operation and, in particular, protection against jamming of a window lifter, it is essential to accurately detect at every instant the angle of rotation, the speed of rotation, and the direction of rotation of the rotary drive 1. By means of the detection of these variables, it is possible to uniquely detect the position and direction of movement as well as the dynamic characteristics of a displaceable object driven by the rotary drive 1, for example, an electrically adjustable window pane or a sun roof. Dynamic characteristics here are speed and acceleration values of the displaceable object.

Figure 2:
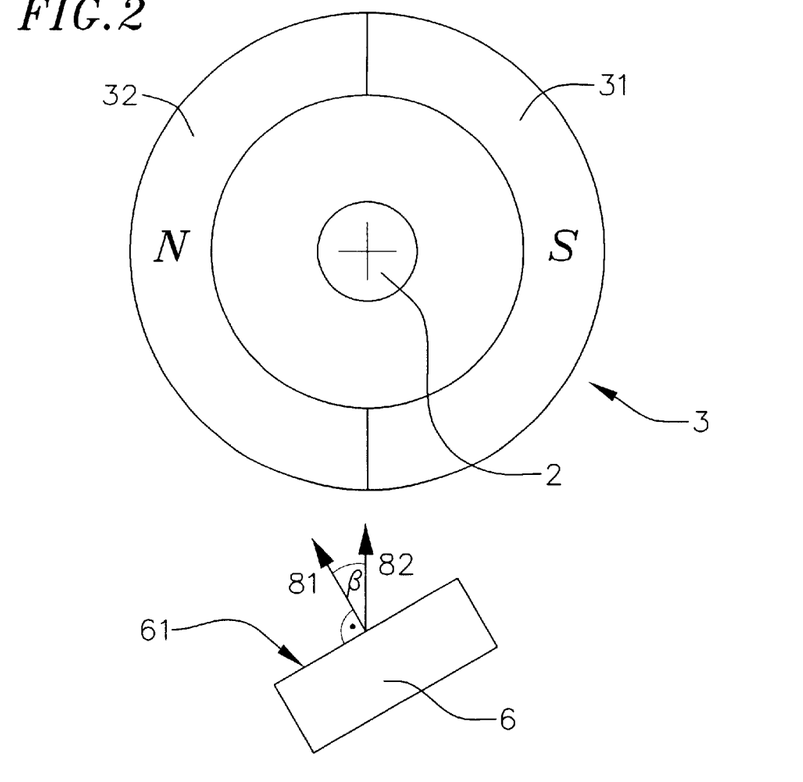
FIG. 2 a cross-section through an arrangement according to the invention with a Hall sensor disposed at an angle.

FIG. 2 depicts a first arrangement wherein, in addition to the speed of rotation, it is possible to detect the angle of rotation, the direction of rotation, and, in particular, an exact reversal of direction using only one sensor element.

According to FIG. 2, a N-S magnetized annular permanent magnet 3 with two equal-sized sectors 31, 32 of different polarity N, S is disposed on the axis of rotation 2.

A Hall sensor 6 is associated with the annular magnet 3. The Hall sensor 6 usually consists in a known manner of a thin, rectangular semiconductor wafer 61, provided with electrodes (not shown). When the wafer 61 is penetrated by the magnetic field lines of the annular magnet 3, a Hall voltage, which is proportional to the component of the magnetic field perpendicular to the semiconductor wafer 61, appears between the electrodes mounted on the longitudinal sides of the semiconductor wafer 61. The semiconductor wafer 61 represents the sensitive surface of the sensor element 6. The sign of the Hall voltage changes when the magnetic field direction changes.

The Hall sensor 6 is aligned relative to the annular magnet 3 or its axis of rotation 2 such that the normal vector 81 to the semiconductor wafer 61 does not point, as in known sensor arrangements, in the direction of the axis of rotation 2, but rather is disposed at an angle to the (imaginary) vector 82 pointing at the axis of rotation 2. The Hall sensor 6 is, in this case, tipped relative to an axis which runs substantially parallel to the axis of rotation 2, whereby the normal vector 81 of the sensitive surface 61 of the Hall sensor 6 lies in the plane perpendicular to the axis of rotation 2, in which the annular magnet 3 also is found.

Figure 2A:
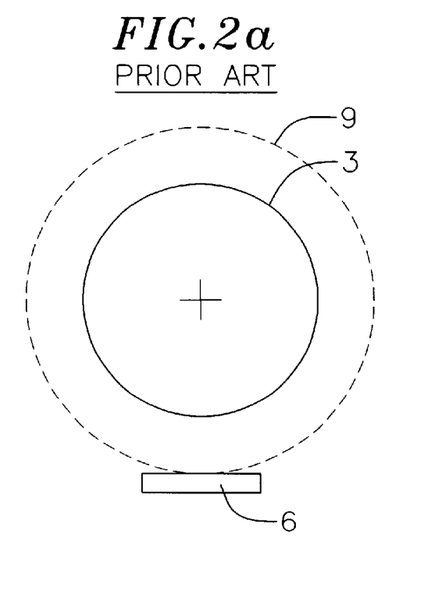
FIGS. 2a–2b schematically, the geometric relationships of the arrangement with a sensor element disposed transversely and at an angle, respectively.
Figure 2B:
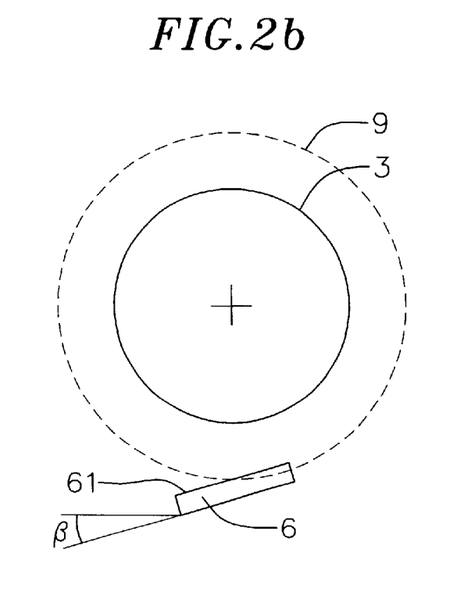

In other words, the Hall sensor 6 is aligned such that the sensitive surface 61 of the sensor 6 has an orientation which deviates from a tangential position on an imaginary circle drawn around the axis of rotation 2. FIGS. 2a and 2b clarify this depiction of the arrangement of the Hall sensor 6 with respect to an annular magnet 3 or a magnetic disk 3. In FIG. 2a, the sensor element 6 is disposed, according to the prior art, transverse to the annular magnet or magnetic disk 3 and, consequently, is tangential to an imaginary circle 9 around the axis of rotation 2 and the annular magnet or magnetic disk 3. In FIG. 2b, the sensor element 6 has been tipped by an angle β such that the sensitive surface 61 is no longer tangential to the circle 9.

By the orientation of the Hall sensor 6 deviating from a transverse position, a voltage signal is generated on the Hall sensor 6 during rotation of the annular magnet 3, which signal has a rising or falling voltage waveform for each sector 31, 32 and, consequently, is not symmetric. Consequently, in addition to the speed of rotation, the angle of rotation and the direction of rotation are also encoded by the signal detected. This is clear from the signal waveforms depicted in FIGS. 4a–4c.

Figure 4A:
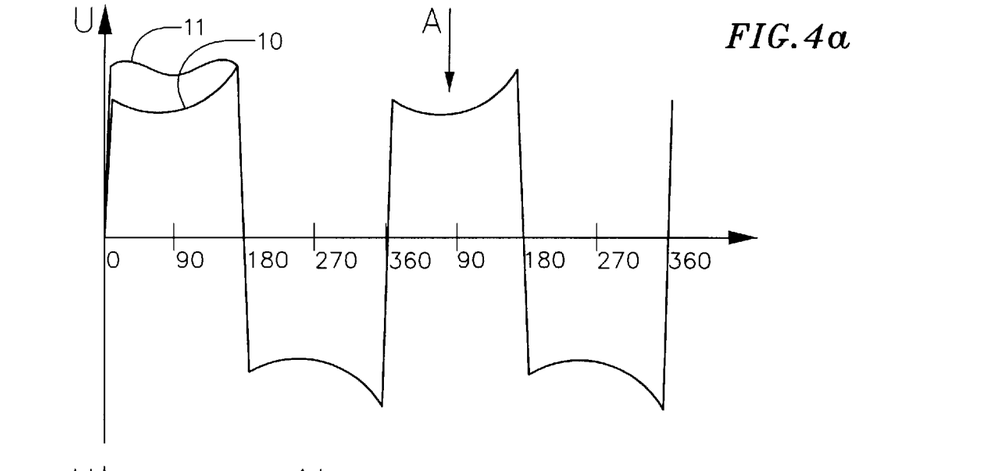
FIGS. 4a–4c the waveform of the magnetic field strength on a Hall sensor over an angular region of 720° in an arrangement according to FIG. 2 or 3 in the case of right-hand rotation, left-hand rotation, and a change in direction, respectively.
Figure 4B:
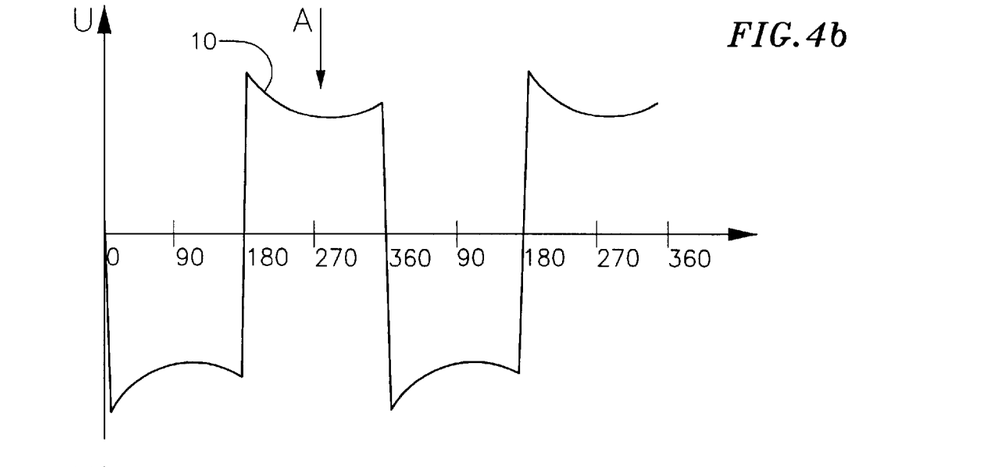
Figure 4C:
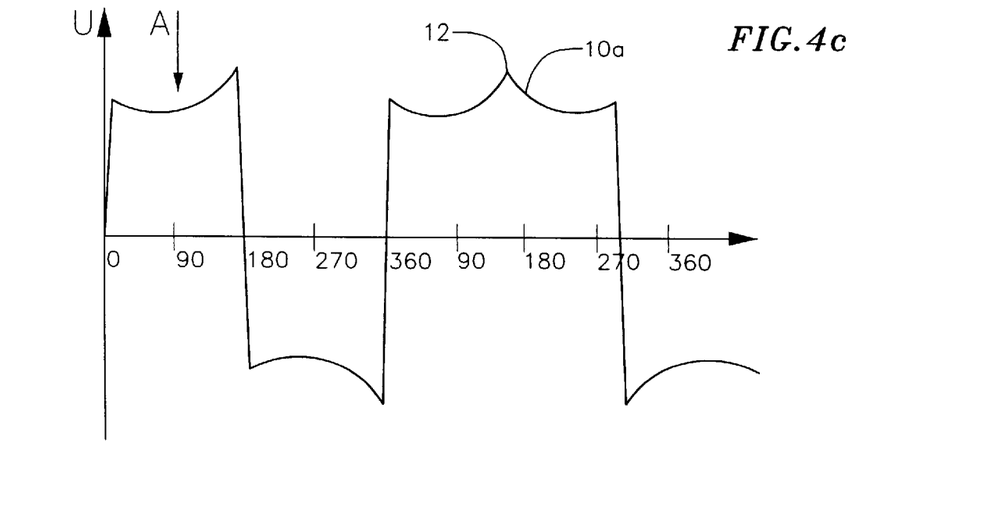

FIGS. 4a–4c depict the Hall voltage U generated in the arrangement according to FIG. 2 as a function of the angle of rotation of the annular magnet 3. The Hall voltage U is proportional to the magnetic field strength H on the Hall sensor 6.

Because of the tipped orientation of the Hall sensor 6, the voltage waveforms generated by the Hall sensor 6 during the travel of a sector 31, 32 of the annular magnet 3 past the Hall sensor 6, i.e., through an angular region of 180°, are not substantially constant and symmetric, but rise or drop. FIG. 4a depicts the case of right-hand rotation; and FIG. 4b, the case of left-hand rotation.

According to FIGS. 4a and 4b, the Hall voltage 10 has a different magnitude both with right-hand and with left-hand rotation, at the beginning and at the end of a pulse A generated by a passing sector 31, 32. For comparison, FIG. 4a depicts the voltage waveform 11 for the region up to 180° during detection of the magnetic field by a Hall sensor aligned on the axis of rotation 2 in the prior art manner. Here, the voltage values detected at the beginning and the end of a pulse A are identical and the voltage waveform is symmetrical.

The Hall voltage U detected by the Hall sensor 6 disposed at an angle accurately encodes, as explained in the following, the angle of rotation, the speed of rotation, the direction of rotation, changes in direction, as well as changes in rotational speed.

To detect the speed of rotation, the individual pulses A are converted in a known manner by means of a Schmitt trigger into a digital meter pulse sequence. By counting the individual digital pulses, the speed of rotation is determined. The number of digital pulses during a specific time interval yields the average speed of rotation during the time interval in question.

Detection of a direction of rotation is possible through a valuation of the voltage waveform 10 within a pulse A. The sign of the voltage curve, i.e., the rise direction, changes with a reversal of direction of rotation. The evaluation of the voltage waveform 10, consequently, enables direct determination of the direction of rotation. Within a voltage pulse A, each angular position of the annular magnet 3 corresponds to a specific voltage value such that the angle of rotation is very accurately detectable by means of the current voltage value. Of course, an evaluation of the voltage waveform 10 occurs before the analog signal is converted into a digital rotation pulse sequence, since the information concerning the direction of rotation and the angle of rotation is lost in the process.

FIG. 4c depicts the case of a change in direction of the rotational movement. With a change in direction—and only then—there is a symmetrical signal waveform 10a. Thus, the magnetic field strength on the Hall sensor 6 and, thus, the voltage signal detected after a change in direction is a mirror image relative to the time of the change in direction. The time of a change in direction can be detected very exactly in that the maximum 12 or minimum of the symmetrical signal occurring at the time of a change in direction is determined. Because of the asymmetrical voltage waveform within a pulse A, a voltage maximum or minimum always occurs of necessity at the time of a change in direction.

Figure 5:
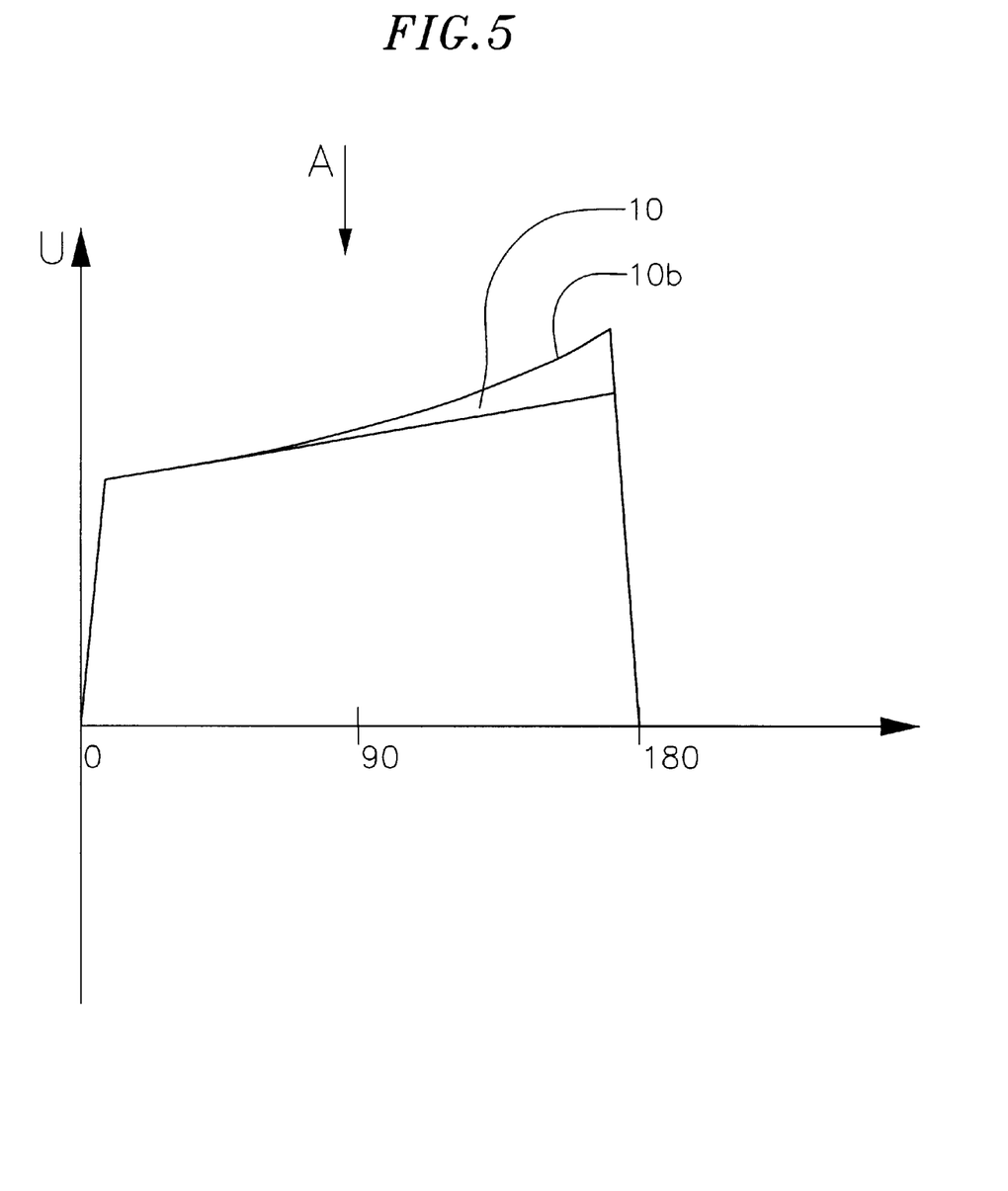
FIG. 5 the waveform of the magnetic flux density on a Hall sensor upon occurrence of a change in speed of rotation.

Moreover, the waveform 10 very precisely, i.e., within one voltage pulse A, encodes a possible change in speed, or acceleration, of the rotation of the rotary drive 1. A possible voltage waveform is depicted in FIG. 5. With an accelerated movement, the shape of the waveform changes such that the curve is not substantially linear (voltage waveform 10), but rather rises in a nonlinear fashion (voltage waveform 10b). An accelerated movement is clearly detectable, for instance, through the formation of the first deviation of the voltage signal. In FIG. 5, the shapes of the curves are presented in idealized fashion to illustrate the principle applied. In actuality, the individual pulses A have, as depicted in FIGS. 4a–4c, a small intermediate maximum or minimum. However, this does not alter the fact that with an accelerated movement, the first deviation of the detected signal appears.

Figure 3:
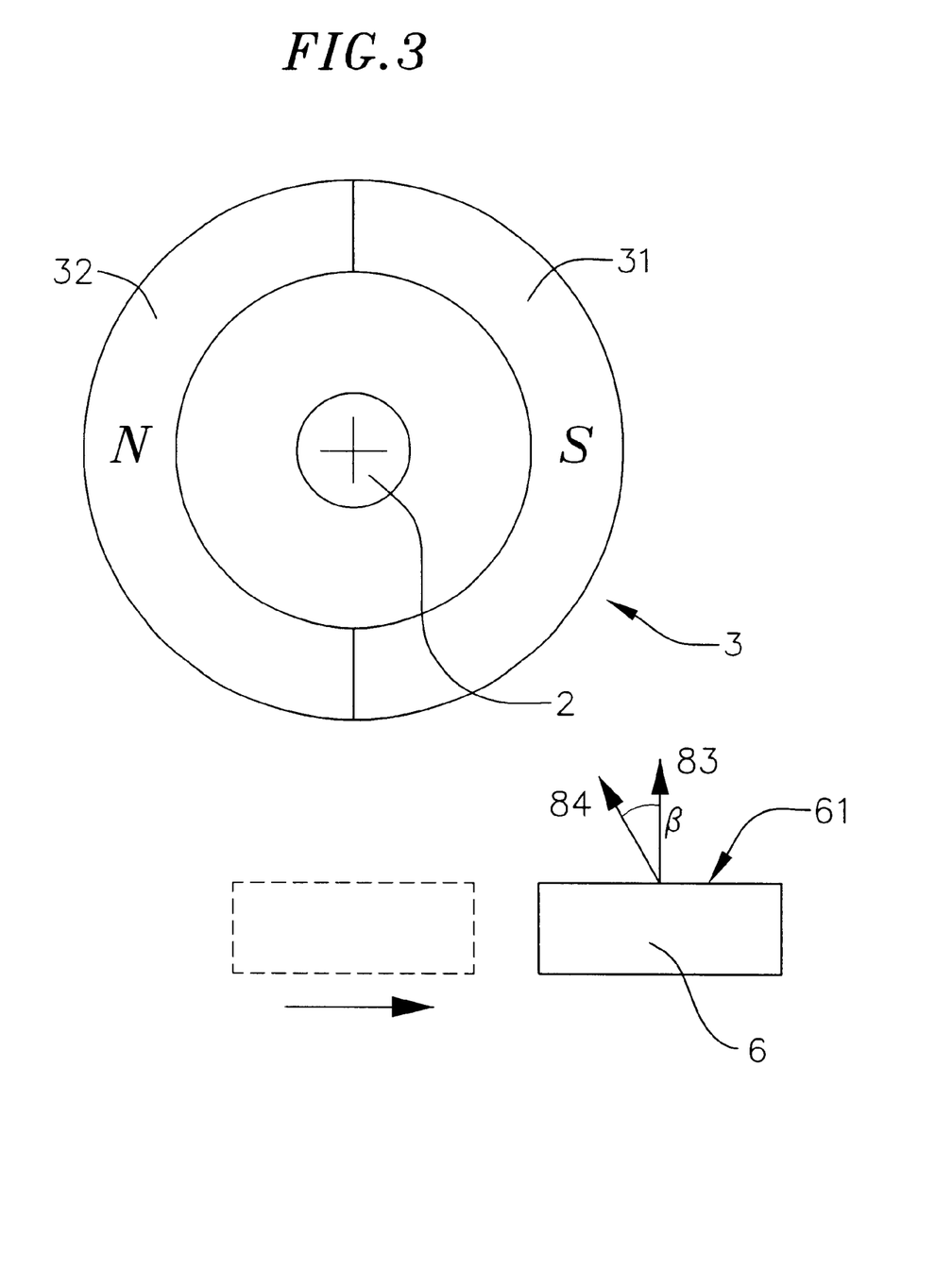
FIG. 3 a cross-section through an arrangement according to the invention with a Hall sensor shifted laterally out of the transverse position.

FIG. 3 depicts another arrangement that enables detection of the angle of rotation, the speed of rotation, and/or the direction of rotation of a rotary drive with only one sensor 6. In contrast with the arrangement of FIG. 2, the sensor 6 here is not tipped by an angle β out of the transverse position, but is laterally shifted out of the transverse position (depicted by dashed lines). In this case as well, the normal vector 83 of the sensitive surface 61 of the sensor 6 does not point in the direction of the axis of rotation 2, but forms an angle β relative to a vector 84 pointing from the sensor element 6 to the axis of rotation 2.

The voltage waveforms generated on the sensor 6 with the orientation depicted in FIG. 3 are identical to the voltage waveforms according to the arrangement of FIG. 2, such that reference is made to the aforementioned embodiments in this regard.

In alternative embodiments a larger number of N-S magnetized sectors of equal size are provided, rather than just two N-S magnetized sectors 31, 32. Accordingly, the precision of the evaluation increases while using basically the same structure.

Figure 7A:
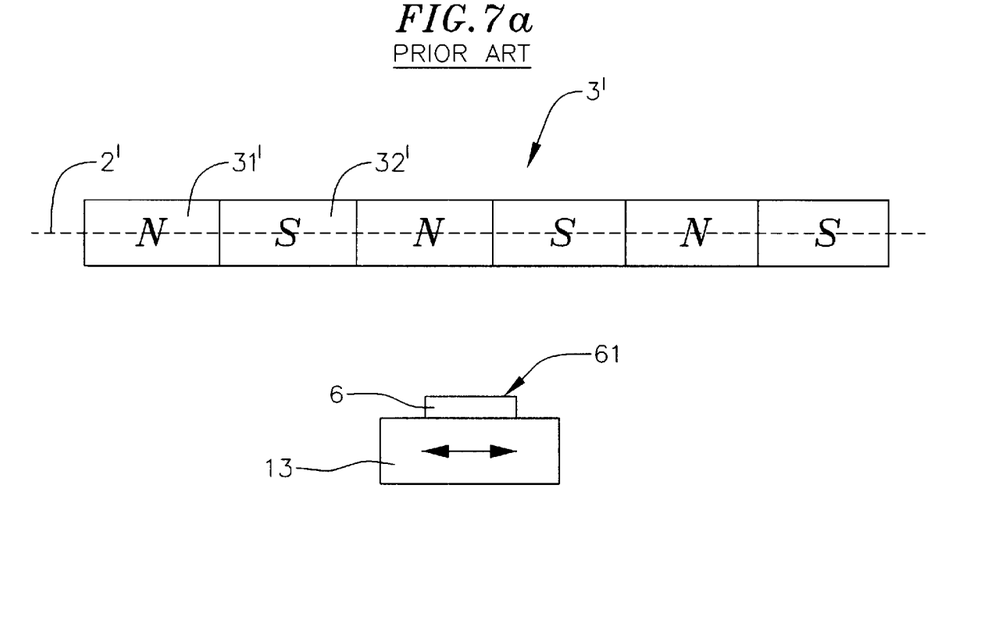
FIG. 7a schematically, an arrangement for the detection of a translatory movement between a signal-generating element extending longitudinally and a Hall sensor according to the prior art, and FIG. 7b schematically, an arrangement according to the invention for the detection of a translatory movement between a signal-generating element extending longitudinally and a Hall sensor.
Figure 7B:
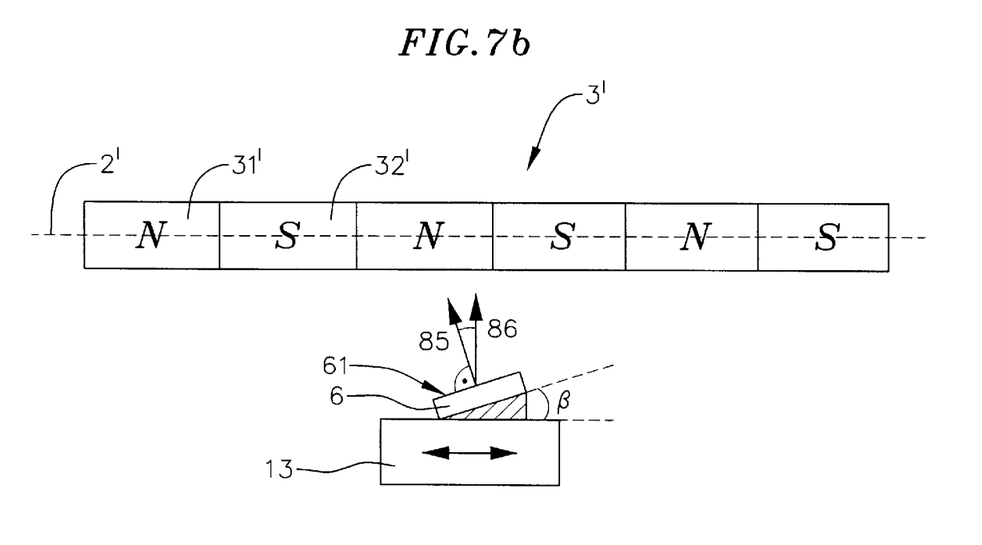

FIG. 7b depicts another variant of the invention. FIG. 7a depicts, according to the prior art, a signal-generating element 3' extending longitudinally, which has alternating segments 31', 32' of different magnetic polarity N, S. The signal-generating element 3' has a longitudinal axis 2', along which the individual segments 31', 32' are disposed. The signal-generating element 3' may, for example, be a bar magnet, but may also be a magnetic strip which has alternating N-S magnetized regions. The signal-generating element 3' is connected, for example, to a first aggregate part (not shown) of an aggregate.

A Hall sensor 6, which is designed as in the previous figures and is connected with an evaluation unit (not shown), is associated with the signal-generating element 3'. The Hall sensor 6 is attached on a schematically depicted second aggregate part 13, which is translatorily shiftable relative to the signal-generating element 3' or the first aggregate part connected therewith, and represents, in particular, a part of a window lifter mechanism or a sun roof mechanism in motor vehicles.

With a relative movement parallel to the longitudinal axis 2' between the aggregate part 13 or Hall sensor 6 and the signal-generating element 3', a voltage is generated in the Hall sensor 6, which is alternatingly positive or negative depending on the magnetic field lines passing through the Hall sensor 6. By evaluation of the voltage waveform, it is possible to determine the relative speed between the signal-generating element 3' and the Hall sensor 6. However, because of the symmetrical voltage signal, it is impossible to determine the direction of movement.

In FIG. 7b, the Hall sensor 6 is aligned, according to the invention, relative to the signal-generating element 3' or its longitudinal axis 2' such that the normal vector 85 to the sensitive surface 61 of the sensor element 6 does not point, as in known sensor arrangements, perpendicular to the longitudinal axis 2', but rather is disposed at an angle β relative to the (imaginary) vector 86, which is perpendicular to the longitudinal axis 2'. The sensitive surface 61 of the Hall sensor 6 is tipped by an angle β relative to an axis parallel to the longitudinal axis 2' of the signal-generating element 3'.

Due to the orientation of the Hall sensor 6 at an angle to the longitudinal axis 2', a relative movement between the signal-generating element 3' and the Hall sensor 6 generates a voltage signal, which has a rising or falling signal waveform for each sector 31', 32' depending on the direction of movement. Consequently, in addition to the speed of the translatory movement, the direction of movement is also encoded by the signal detected.

Also, a reversal of direction can be precisely determined since the voltage signal has a maximum or a minimum at the point of the reversal of direction and is symmetrical about the maximum or the minimum. The voltage waveform corresponds to the voltage waveform described in FIGS. 4a–4c. A change in speed is likewise precisely detectable within one voltage pulse, as described above with regard to FIG. 5.

Figure 6:
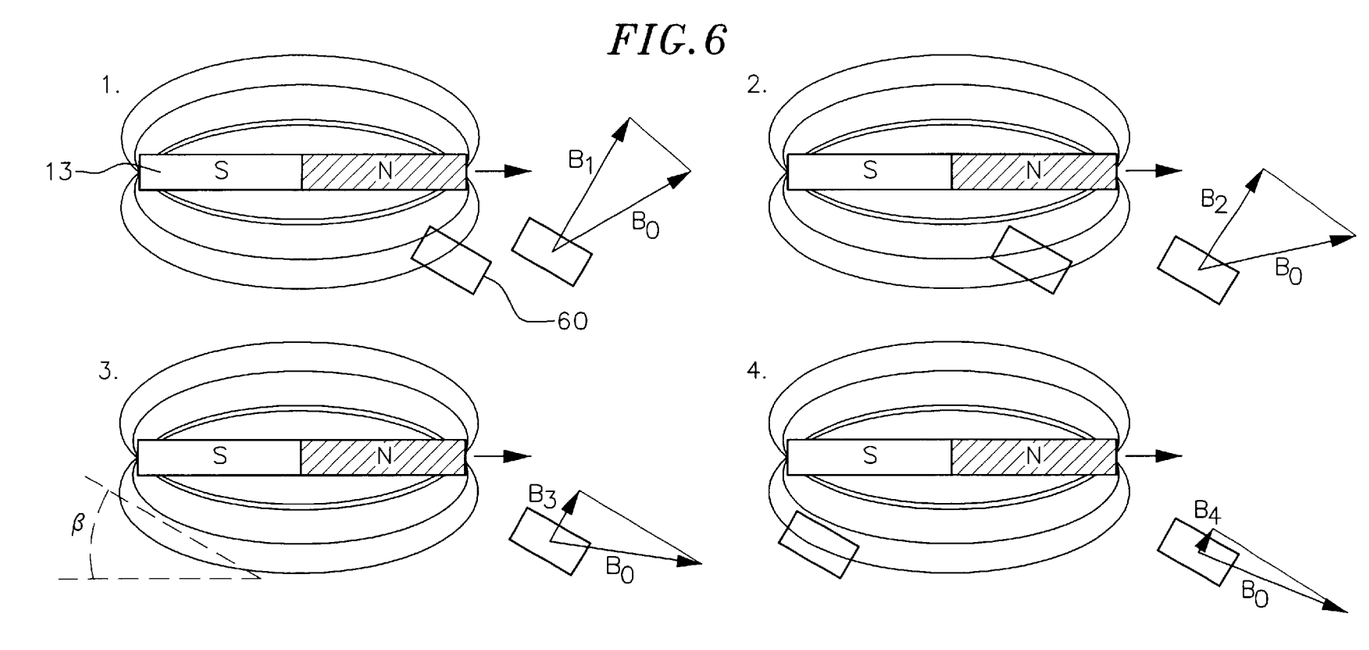
FIG. 6 for explanation of the principles underlying the invention, an illustration of the variation in the normal component of magnetic field strength on the sensor element during the movement of a sensor element disposed at an angle in the magnetic field of a bar magnet.

FIG. 6 explains the mode of operation of the invention on a Hall sensor 60 rotated by an angle β, which moves in a linear fashion in the magnetic field of a bar magnet 13. In each case, only the normal component $B_1$, $B_2$, $B_3$, $B_4$ of the magnetic field strength generates voltage on the semiconductor wafer of the Hall sensor 60. It is assumed that the magnetic field strength or the magnetic flow density $B_0$ is constant.

Figure 6A:
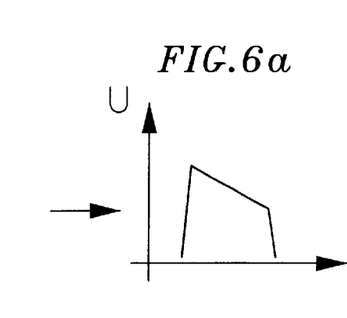
FIG. 6a for explanation of the principles underlying the invention, the voltage waveform on the sensor element during the left-to-right movement of the sensor element disposed at an angle in the magnetic field of a bar magnet.
Figure 6B:
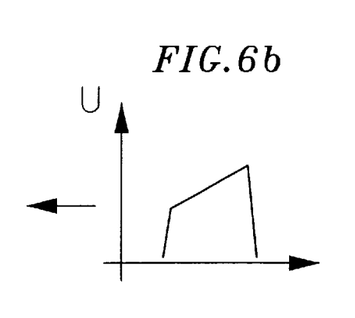
FIG. 6b for explanation of the principles underlying the invention, the voltage waveform on the sensor element during the right-to-left movement of the sensor element disposed at an angle in the magnetic field of a bar magnet.

Because of the oblique position of the Hall sensor 60, the normal component $B_1$, $B_2$, $B_3$, $B_4$ of the magnetic induction B has, during a linear movement of the Hall sensor 60 in the magnetic field of the bar magnet 13, in each case a different value such that a waveform develops in which the Hall voltage U of the sensor 60 in the magnetic field is not constant, but rather rises or falls, depending on the direction of movement as shown in FIGS. 6a and 6b. The same result is obtained with the arrangement of a sensor in the field of an annular magnet if both move relative to each other around a reference axis and the sensor is disposed relative to the annular magnet such that the normal vector of the sensitive surface of the sensor element does not point in the direction of the axis of rotation of the annular magnet. This concept underlies the present invention.

The invention is not restricted in its implementation to the exemplary embodiments indicated above. Rather, a number of variants which make use of the process according to the invention, even with fundamentally different types of embodiments, are conceivable.

What is claimed is:

1. An arrangement for detection of a rotational movement of a rotary drive having a rotational axis comprising,
    a signal-generating element nonrotatably connected to the rotary drive, the signal generating element having uniformly disposed segments of different magnetic polarity, and an analog, magnet-sensitive sensor element having a sensitive surface,
    wherein the signal-generating element and the sensor element are arranged, such that during rotation of the rotary drive, the sensor element generates signal pulses that have a rising or falling waveform between their edges depending on the direction of rotation of the rotary drive, and such that when the direction of rotation is reversed, the sign of the waveform changes,
    wherein the signal-generating element is disposed concentrically on the rotational axis of the rotary drive and the sensor element is oriented away from a transverse orientation at least around an axis which runs parallel to the axis of rotation and is aligned such that the normal vector of the sensitive surface forms an angle relative to a vector pointing from the sensor element perpendicular to the axis of rotation of the signal-generating element.

2. An arrangement according to claim 1,
    wherein the sensor element is tipped away from a transverse orientation relative to an axis that runs substantially parallel to the axis of rotation.

3. An arrangement according to claim 1,
    wherein the sensor element is laterally offset from a transverse position relative to the axis of rotation of the signal-generating element.

4. An arrangement according to claim 1,
    wherein the signal-generating element comprises an annular magnet or a magnetic disk.

5. An arrangement according to claim 1, wherein the magnet-sensitive sensor element comprises a Hall sensor,
    wherein the sensitive surface of the sensor element comprises a semiconductor wafer of the Hall sensor and a maximum signal is generated by the sensor element with perpendicular incidence of magnetic field lines upon the sensor element.

6. An arrangement according to claim 1, wherein the signal pulses are analog voltage signal pulses, and
    further comprising an evaluation unit to conduct an evaluation of the analog voltage signal pulses and an analog/digital converter to convert the analog voltage signal pulses appearing on the sensor element into a digital signal after the evaluation unit conducts the evaluation of the analog voltage signal pulses.

7. An arrangement according to claim 1,
    wherein the signal pulses are analog voltage signal pulses, and
    wherein means for evaluation of the waveform of the analog voltage signal pulses as well as a threshold value switch, which converts the analog voltage signal pulses appearing on the sensor into a digital signal, are integrated into the sensor element.

8. An arrangement for detection of a translatory movement, comprising
    a signal-generating element having segments of different magnetic polarity disposed alternatingly along a longitudinal axis, and
    an analog, magnet-sensitive sensor element having a sensitive surface,
    wherein the sensor element generates signal pulses that have a rising or falling waveform between their edges depending on the direction of movement, such that when the direction of movement is reversed, the sign of the waveform changes,
    wherein the sensor element is aligned such that a normal vector of the sensitive surface of the sensor element forms an angle with a vector pointing from the sensor element perpendicular to the longitudinal axis of the signal-generating element.

9. An arrangement according to claim 2,
    wherein the signal-generating element comprises a bar magnet or a magnetic strip.

10. An arrangement according to claim 2,
    wherein the magnet-sensitive sensor element comprises a Hall sensor,
    wherein the sensitive surface of the sensor element comprises a semiconductor wafer of the Hall sensor and a maximum signal is generated by the sensor element with perpendicular incidence of magnetic field lines upon the sensor element.

11. An arrangement according to claim 8,
    wherein the signal pulses are analog voltage signal pulses, and
    further comprising an evaluation unit to conduct an evaluation of the analog voltage signal pulses and an analog/digital converter to convert the analog voltage signal pulses appearing on the sensor element into a digital signal after the evaluation unit conducts the evaluation of the analog voltage signal pulses.

12. An arrangement according to claim 8,
    wherein the signal pulses are analog voltage signal pulses, and
    means for evaluation of the waveform of the analog voltage signal pulses as well as a threshold value switch, which converts an analog voltage appearing on the sensor into a digital signal, are integrated into the sensor element.

13. An arrangement for detection of a rotational movement of a rotary drive having a rotational axis comprising,
    a signal-generating element nonrotatably connected to the rotary drive, the signal generating element having uniformly disposed segments of different magnetic polarity, and an analog, magnet-sensitive sensor element having a sensitive surface,
    wherein the signal-generating element and the sensor element are arranged, such that during rotation of the rotary drive, the sensor element generates signal pulses that have a rising or falling waveform between their edges depending on the direction of rotation of the rotary drive, and such that when the direction of rotation is reversed, the sign of the waveform changes, wherein the signal-generating element is disposed concentrically on the rotational axis of the rotary drive and the sensor element is oriented away from a transverse orientation at least around an axis which runs parallel to the axis of rotation and is aligned such that, in a plane perpendicular to the axis of rotation, the normal vector of the sensitive surface forms an angle relative to a vector pointing from the sensor element perpendicular to the axis of rotation of the signal-generating element.

14. The arrangement according to claim 13, wherein the sensor element is aligned such that, in a plane perpendicular to the axis of rotation, the normal vector of the sensitive surface forms an angle relative to a vector pointing from the center of the sensor element perpendicular to the axis of rotation of the signal-generating element.

* * * * *

UNITED STATES PATENT AND TRADEMARK OFFICE
CERTIFICATE OF CORRECTION

PATENT NO. : 6,448,760 B1
DATED : September 10, 2002
INVENTOR(S) : Neumann et al.

It is certified that error appears in the above-identified patent and that said Letters Patent is hereby corrected as shown below:

Title page,
Item [30], Foreign Application Priority Data, replace
"Nov. 14, 1996 (DE) …… 196 48 622" with -- Nov. 14, 1996 (DE) …… 196 48 662 --.

Column 10,
Lines 25 and 28, replace "claim 2" with -- claim 8 --.

Signed and Sealed this

Twenty-seventh Day of May, 2003

JAMES E. ROGAN
*Director of the United States Patent and Trademark Office*